United States Patent
Ito et al.

(10) Patent No.: US 7,801,668 B2
(45) Date of Patent: Sep. 21, 2010

(54) METHOD AND APPARATUS FOR CONTROLLING COMBUSTION IN GENERATOR GAS ENGINE

(75) Inventors: Kuninori Ito, Yokohama (JP); Michio Abe, Yokohama (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 404 days.

(21) Appl. No.: 11/987,343

(22) Filed: Nov. 29, 2007

(65) Prior Publication Data

US 2008/0147303 A1    Jun. 19, 2008

Related U.S. Application Data

(63) Continuation-in-part of application No. 10/803,975, filed on Mar. 19, 2004, now Pat. No. 7,363,883.

(51) Int. Cl.
*B60T 7/12* (2006.01)
*F02B 43/08* (2006.01)

(52) U.S. Cl. ............... 701/108; 701/115; 123/3; 123/406.23

(58) Field of Classification Search ............... 701/100, 701/101, 103, 108, 111, 114, 115; 123/3, 123/27 R, 27 GE, 525, 527, 406.23
See application file for complete search history.

(56) References Cited

U.S. PATENT DOCUMENTS 5,526,645 A * 6/1996 Kaiser ............... 60/611
5,915,365 A    6/1999 Meisinger et al.
6,176,224 B1   1/2001 Wu et al.
6,578,559 B2   6/2003 Kilmer (Continued)

FOREIGN PATENT DOCUMENTS

| CN | 1462335    | 12/2003 |
|----|------------|---------|
| JP | 2003-074372| 3/2003  |
| WO | 02/079629  | 10/2002 |

OTHER PUBLICATIONS

Ryoji Nakano, et al., "Development of High Power KU30GA Gas Engine", Oct. 2001, vol. 38 No. 3, pp. 141-145.

*Primary Examiner*—John T Kwon
(74) *Attorney, Agent, or Firm*—Wenderoth, Lind & Ponack, L.L.P (57) ABSTRACT

A method and apparatus are provided for controlling combustion in a pilot ignition gas engine connected to an electric generator of a power generator unit installed near a coal mine. The engine utilizes recovered methane gas and ventilation air methane gas from the coal mine by adjusting methane concentration to produce a lean air-methane gas mixture. Gas engine output torque is controlled to maintain $|\Delta Td|-|\Delta Ts|>0$, where $|\Delta Td|$ is the absolute value of change rate of load torque Td required to drive the generator in relation to engine rotation speed, and $|\Delta Ts|$ is the absolute value of change rate of output torque Ts in relation to engine rotation speed at an intersection of torque curves. Excess air ratio is controlled to be 2 or larger so that lean mixture burning is performed while avoiding misfiring and knocking by controlling the mixing ratio of recovered methane gas with ventilation air methane.

8 Claims, 10 Drawing Sheets

U.S. PATENT DOCUMENTS

| | | |
|---|---|---|
| 6,595,001 B2 | 7/2003 | Rautenbach et al. |
| 6,675,748 B2 * | 1/2004 | Ancimer et al. ........... 123/27 R |
| 6,810,320 B2 | 10/2004 | Yamamoto et al. |
| 7,143,572 B2 | 12/2006 | Ooka et al. |
| 2002/0166515 A1 * | 11/2002 | Ancimer et al. ........... 123/27 R |
| 2003/0188714 A1 | 10/2003 | Yamamoto et al. |

* cited by examiner

METHOD AND APPARATUS FOR CONTROLLING COMBUSTION IN GENERATOR GAS ENGINE

CROSS-REFERENCE TO RELATED APPLICATION

This is a continuation-in-part of U.S. application Ser. No. 10/803,975, filed Mar. 19, 2004 now U.S. Pat. No. 7,363,883.

FIELD OF THE INVENTION

The present invention relates to a method and apparatus for controlling combustion in a gas engine employed in a gas engine electric power generator to effectively utilize coal mine methane gas which is low in methane concentration and large in variation thereof, thereby serving to smoothly advance the economic development in developing countries by utilizing the profit made by electric power generation and also made by GHG (greenhouse gas) emission trade.

DESCRIPTION OF THE RELATED ART

In growing awareness of a worldwide environmental problem, country-by-country objectives of reduction of carbon dioxide emission was decided at the 3rd Conference of the Parties to the United Nations Framework Convention on Climate Change held in 1997 in Kyoto. In the meeting, a Kyoto mechanism was established for the reduction of GHG (CO2, CH4, N2O, etc.) emissions in accordance with the conditions of countries and for the promotion of the efficiency of reduction.

The Kyoto mechanism is a system to promote worldwide cooperation and emission credit dealing for the reduction of GHG, in which a concept of carbon dioxide emission credit (right to emit a certain amount of carbon dioxide) was introduced and which aims to utilize market principles as a supplementary scheme for achieving the reduction objective of each country. When each entity (nations, enterprises, stores, families, etc.) takes action of directly exhausting GHG (for example, consuming energy for operating machines, consuming gasoline for running vehicles, etc.) or when it takes action of indirectly exhausting GHG (for example, mining of coal, selling of gasoline, etc.), it is under an obligation to pay carbon dioxide emission credit corresponding to the exhausted amount of GHG.

As for energy, coal industries of coal industrial nations of the world (China, CIS, Europe, and the United State) are expected to be important energy suppliers even in the middle part of this century.

However, accompanying mining of coal, methane gas of 10~40 Nm3 (in terms of pure methane) per ton of coal is released to the atmosphere as recovered methane gas (30~50% concentration, air diluted) and ventilated gas (0.3~0.7% concentration, air diluted). Therefore, technology and business to effectively utilize the methane gas now being released to the atmosphere is very prospective and will make large social and economic contributions.

Figure 10:
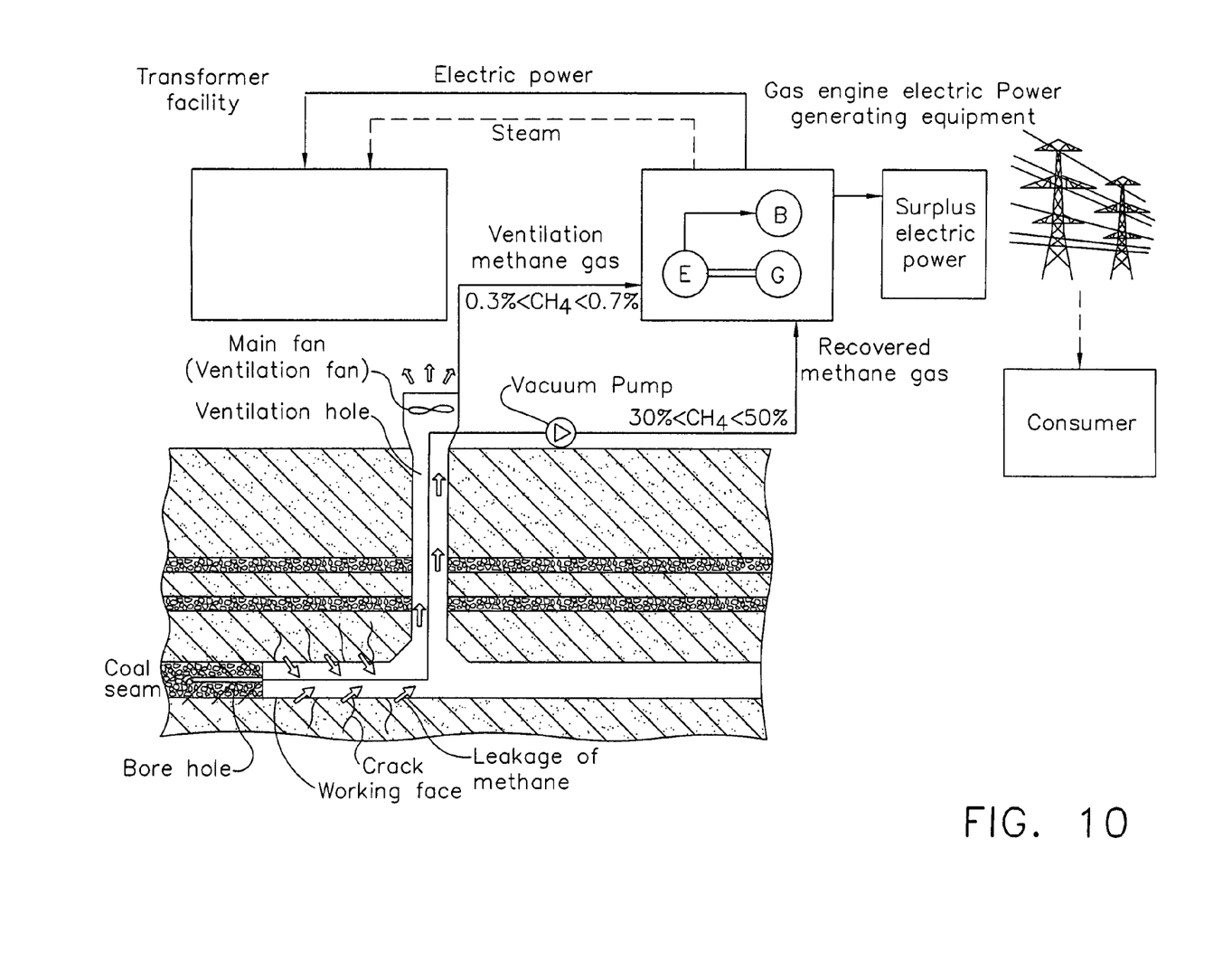
FIG. 10 is a schematic representation showing recovering of coal mine methane gas at a coal mining site.

There are two kinds of coal mine methane gas as shown in FIG. 10; one is recovered methane gas recovered by a vacuum pump from bore holes for degassing for the sake of safety, and the other is methane gas exhausted together with the ventilation air from the mine cavity and coal face. The concentration of methane of these gases is low, that of the former is 30~50% and that of the latter is extremely low at 0.3~0.7%.

To use a boiler or gas turbine as a heat engine to utilize methane gas has been considered.

However, if recovered methane gas having a methane concentration of 30~50% is to be used for a gas turbine or boiler, as combustion temperature is low and methane concentration varies violently, it is not practical. It is difficult to use the recovered methane gas for a gas turbine. Actually, the usage of recovered methane has been limited; it has been used as fuel by nearby households, or in the case of a boiler, used only as auxiliary fuel.

Therefore, as for the utilization of coal mine methane gas, even recovered methane gas is seldom utilized, and almost all of the coal mine methane gas is released to the atmosphere.

However, the greenhouse effect index of methane gas is 21 times that for the case in which the methane gas is burnt and released to the atmosphere as CO2. For example, coal mine methane gas release in China is 1.44 billion m3, which is equivalent to more than 10% of total amount of CO2 release in Japan.

Therefore, if Japan establishes an enterprise to effectively consume the coal mine methane gas in China to change the methane gas to CO2 and release it to the atmosphere as CO2, a reduction of the greenhouse effect index by 20 can be achieved compared to the case in which the methane gas is released to the atmosphere, for greenhouse effect index of methane is 21, on the other hand, greenhouse effect index of CO2 is 1. This reduction of the greenhouse effect index can be traded as an emission credit.

SUMMARY OF THE INVENTION

As mentioned above, there are two kinds of coal mine methane gas as shown in FIG. 10; one is recovered methane gas recovered by a vacuum pump from bore holes for degassing for the sake of safety, and the other is methane gas exhausted together with the ventilation air from the mine cavity and coal face. The concentration of methane of these gases is low, that of the former is 30~50% and that of the latter is extremely low at 0.3~0.7%.

The object of the invention is to provide a method of controlling a generator gas engine capable of effectively utilizing coal mine methane gas low in methane concentration and large in variation of methane concentration as fuel for the gas engine.

First, construction around the combustion chamber of the gas engine to which the present invention is applied will be explained referring to FIG. 1.

Figure 1:
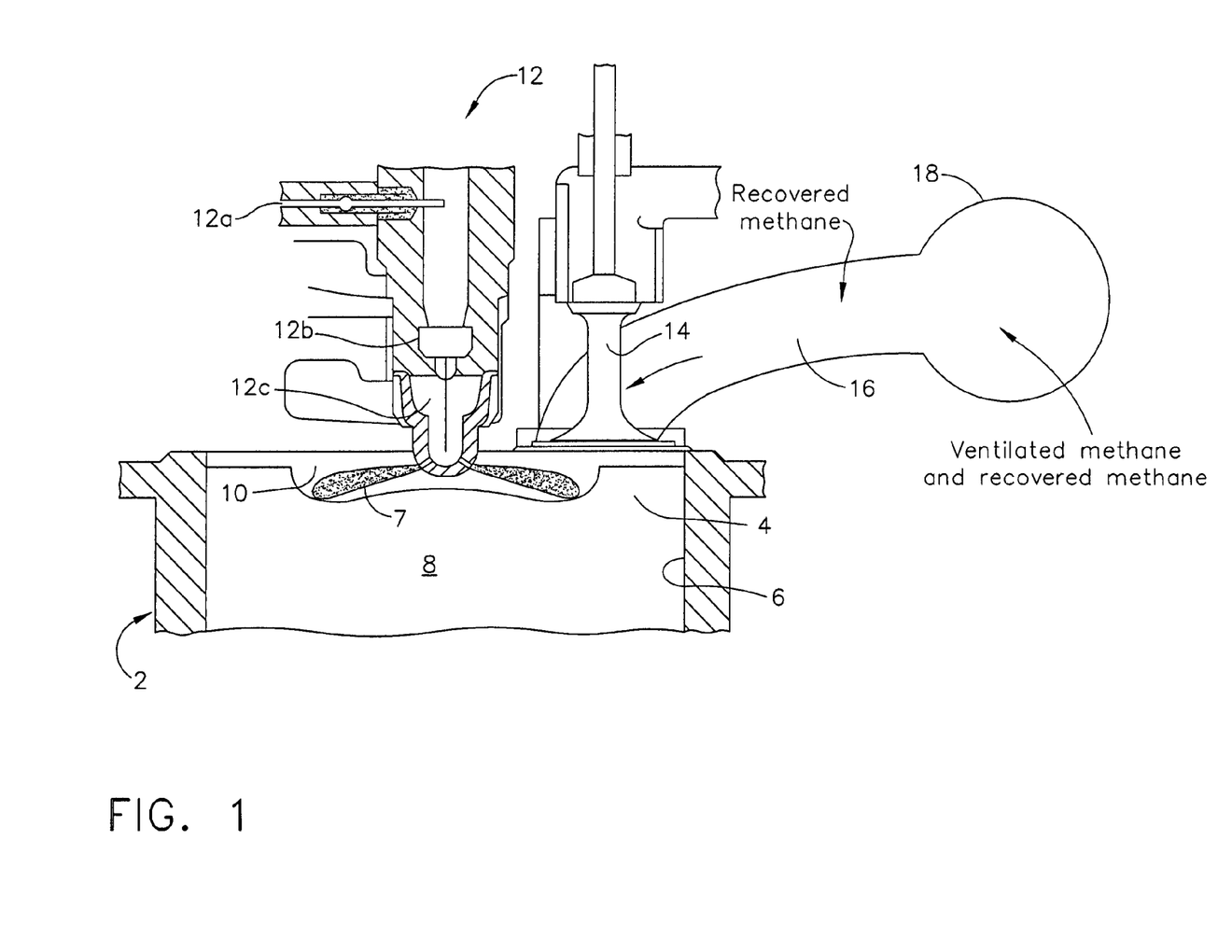
FIG. 1 is a schematic cross-sectional view of the structure of the part around the combustion chamber of the gas engine to which the present invention is applied.

As shown in FIG. 1, reference numeral 2 shows a main part 2 around the combustion chamber of the gas engine. A combustion chamber 10 is formed above a piston 4 in a cylinder room 8 of a cylinder 6. A pilot fuel ignition device 12 having an injection nozzle 12b is mounted above the combustion chamber 10 so that the injection nozzle 12b faces the combustion chamber. Fuel for ignition such as light fuel oil is injected into the subsidiary chamber 12c through a supply pipe 12a, and combustion gas of the pilot fuel produced in the subsidiary chamber 12c is injected into the combustion chamber 10 as flame jets 7 through injection holes of the injection nozzle. Lean air-methane gas mixture in the main combustion chamber 10 is ignited by the flame jets 7.

A mixture of recovered methane gas and ventilated methane gas mixed beforehand is introduced to a common inlet pipe 18 and recovered methane gas is further introduced into an inlet passage 16 which is opened and closed by an inlet valve 14. Thus, an air-methane gas mixture is introduced into the cylinder room 8. Ventilated methane gas of methane concentration of 0.3~0.7% added with recovered methane gas is compressed by a supercharger 19 (see FIG. 2) and supplied to the common inlet pipe 18.

As the gas engine to which the present invention is applied is a pilot ignition engine in which a small amount of fuel (light fuel oil) burnt in the subsidiary chamber is spouted out into the combustion chamber to ignite the air-fuel mixture in the combustion chamber, a lean air-methane gas mixture of methane gas concentration of 10% or lower, preferably a super lean air-methane gas mixture of methane gas concentration of about 3~5% or 3~4%, can be ignited. Therefore, in the invention, recovery methane gas of 30~50% methane concentration and ventilation air methane gas of 0.3~0.7% methane concentration are mixed so that charging air-fuel mixture contains 4~5% of methane gas through control by an engine controller 20.

An excess air ratio $\lambda$ control means 22 in the engine controller 20 controls so that excess air ratio $\lambda$ is 2 or larger. By this, even in the case of very lean air-methane gas mixture, stable ignition and improvement of engine performance can be achieved.

Further, an engine output control means 24 is provided in the engine controller 20 in order to achieve stable rotation of the engine without rotational fluctuation even when the air-fuel mixture in the combustion chamber 10 is a very lean air-methane mixture.

The engine output control means 24 controls engine output by controlling methane gas flow so that a relation $|\Delta Td| - |\Delta Ts| > 0$ is valid between $|\Delta Ts|$ which is the absolute value of the change rate of output torque Ts in relation to rotation speed n, i.e. $|\Delta Ts/\Delta N|$ in the output torque characteristic curve of the engine and $|\Delta Td|$ which is the absolute value of the change rate of torque Td required to drive the generator in relation to rotation speed n, i.e. $|\Delta Td/\Delta N|$ in the characteristic curve of torque required to drive the generator at the intersection point of the Ts curve with the Td curve.

By this, the engine can operate stably at a rotation speed at which a curve of engine output torque having inclination $|\Delta Ts|$ coincides with a curve of torque required for driving the generator having inclination of $|\Delta Td|$ in the torque versus rotation speed characteristic graph, because rotation speed converges to that at the intersection point of both curves. Therefore, rotational fluctuation can be suppressed even in the case of burning a very lean mixture.

Figure 8A:
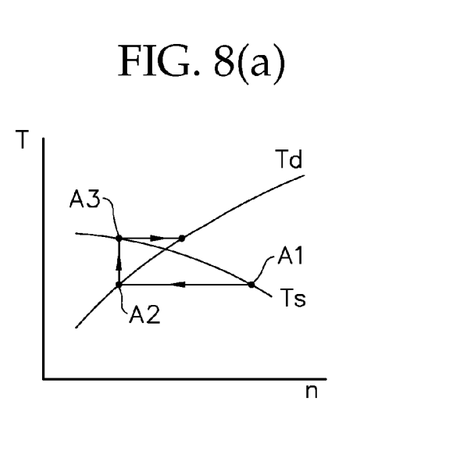
FIGS. 8(a)-8(d) are graphs showing convergence of rotation speed of the engine output torque characteristic curve Ts and the load torque characteristic Td.

This is explained as follows. In FIG. 8(a), the engine output torque characteristic is represented by a curve Ts and the load torque characteristic is represented by a curve Td. In this case, operation of the engine is stable as $\Delta Td > \Delta Ts$. The engine operates stably at a rotation speed at the intersection point of both torque curves of Ts and Td.

In this case, when rotation speed increases from that at the intersecting point to that at a point A1 by any cause, Td>$\Delta$Ts in the case of FIG. 8(a), load torque Td is larger than output torque Ts at a rotation speed at point A1, rotation speed of the engine tends to reduce to that at a point A2 in order to operate at a reduced load torque. As engine output torque at the rotation speed at the point A2 is larger than load torque at the point A2 as shown by a point A3 on the Ts curve, rotation speed of the engine tends to increase. Ultimately, rotation speed converges to that at the intersection point of both curves and rotation speed is stabilized there.

Figure 8B:
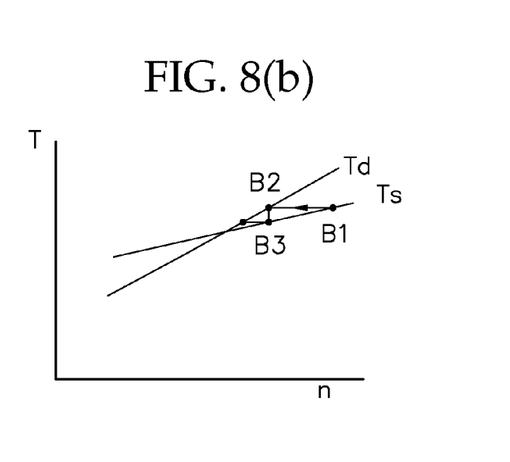

In a case in which torque characteristics Ts and Td are as shown in FIG. 8(b), which is another example of stable operation, when rotation speed increases from that at the intersection point of both curves of Ts and Td to that at a point B1 by any cause, as load torque Td is larger than output torque Ts at the rotation speed at point B1, rotation speed of the engine tends to reduce to that at a point B2 in order to operate at a reduced load torque. As engine output torque at the rotation speed at the point B2 is smaller than the load torque at the point B2 as shown by a point B3 on the Ts curve, rotation speed of the engine further tends to decrease. Ultimately, rotation speed converges to that at the intersection point of both curves and rotation speed is stabilized there.

Figure 8C:
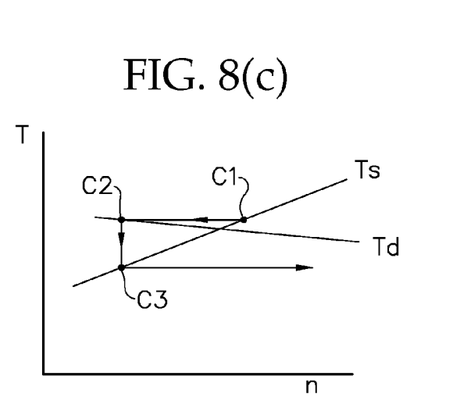

In a case in which torque characteristics Ts and Td are as shown in FIG. 8(c) in which Td<$\Delta$Ts, which is an example of unstable operation. In FIG. 8(c), when rotation speed increases from that at the intersection point of both curves of Ts and Td to that at point C1 by any cause, as load torque Td is smaller than engine output torque Ts at the rotation speed at point C1, rotation speed of the engine tends to reduce to that at a point C2. But in this case, engine output torque Ts decreases as rotation speed decreases and engine torque Ts at the rotation speed at the point C2 is smaller than the load torque at the point C2 as shown by a point C3 on the Ts on the Ts curve, so rotation speed increases, but as there is no point of load torque that is the same as the engine output torque at the point C3 on the Td curve near the intersection point, rotation speed diverges and does not converge. So rotation speed fluctuates and does not stabilize.

Figure 8D:
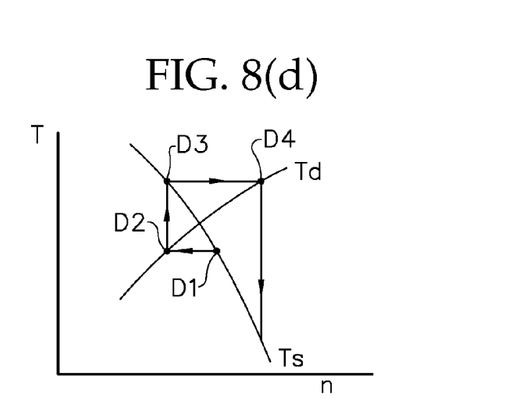

In a case of FIG. 8(d), although $\Delta Td > \Delta Ts$, $|\Delta Td| \not> |\Delta Ts|$. In this case, also rotation speed does not converge. When rotation speed increases from that at the intersecting point of both curves of Ts and Td to that at a point D1 by any cause, as load torque Td is larger than engine output torque Ts at the point D1, rotation speed tends to reduce to that at a point D2. As engine output torque at rotation speed at the point D2 is larger than load torque at the point D2 as shown by a point D3 on the Ts curve, rotation speed tends to increase to a point D4, but engine torque at the rotation speed at the point D4 is smaller load torque at the point D4, rotation speed must again decrease. Thus, rotation speed diverges and does not converge; it fluctuates and does not stabilize.

This method of judging convergence or divergence is well known as the return map method, and the present invention adopted this method to apply to the output torque characteristic of the gas engine and the drive torque characteristic of the generator driven by the gas engine to achieve the stabilization of engine operation.

As a result, by controlling the gas engine so that the relation $|\Delta Td| - |\Delta Ts| > 0$ is maintained at the intersection point of the Ts curve with the Td curve, rotation speed can be stabilized at that at intersection point of the controlled engine output torque with the generator drive torque, and stable operation of the gas engine at a very lean mixture burning is made possible.

Concretely, methane gas flow for achieving the relation $|\Delta Td| - |\Delta Ts| > 0$ at the intersection point of the Ts curve with the Td curve is determined for the combination of a gas engine and generator driven by the engine beforehand by an experiment. That is, methane gas flow is determined for engine rotation speeds in a map, and the engine controller controls methane gas flow according to the map.

Next, as to controlling an excess air ratio $\lambda$ to be 2 or larger, it is preferable that ventilated methane gas of methane concentration of 0.3~0.7% is introduced to the compressor of the supercharger, recovered methane gas is added to individual inlet passage branching from a common inlet passage and connecting to each inlet port of each cylinder, and charging pressure is controlled to control excess air ratio by controlling compression pressure of a supercharger provided on the upstream side from the common inlet passage.

Figure 6:
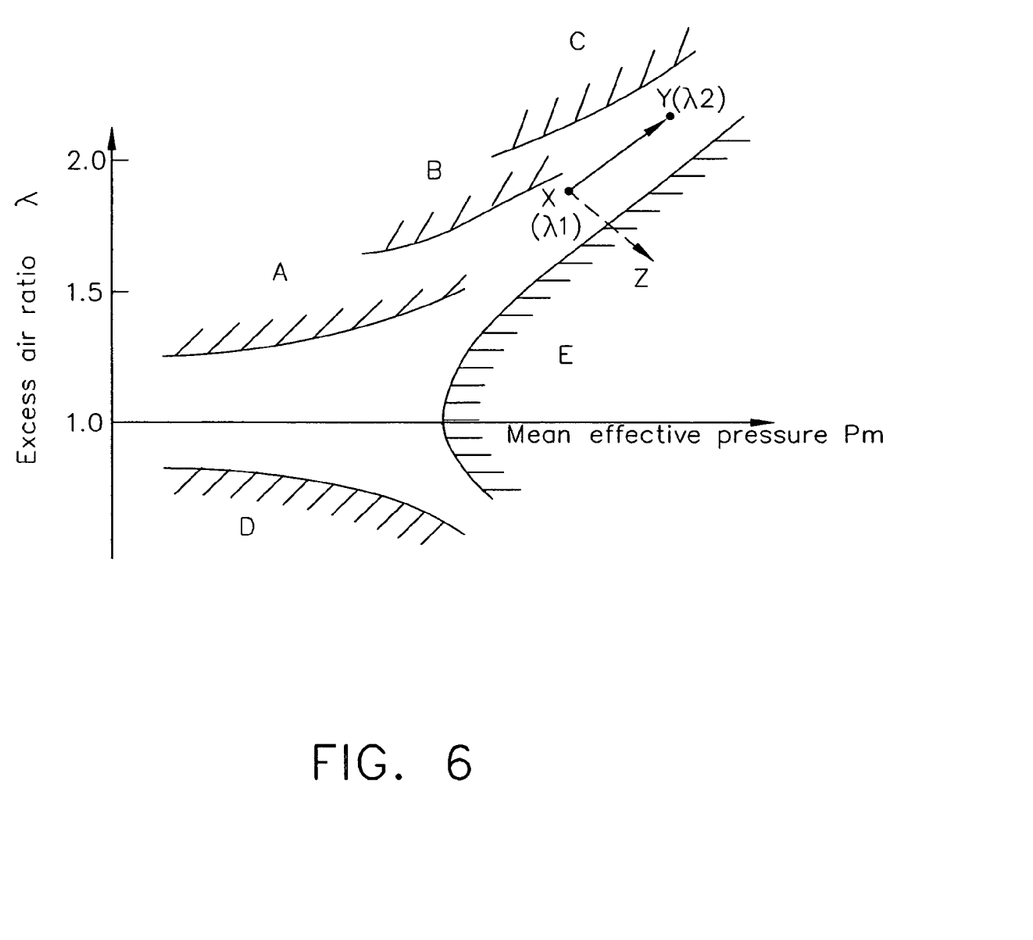
FIG. 6 is a graph showing a misfire zone and a knock zone on a plane represented by mean effective pressure Pme and excess air ratio λ.
Figure 7:
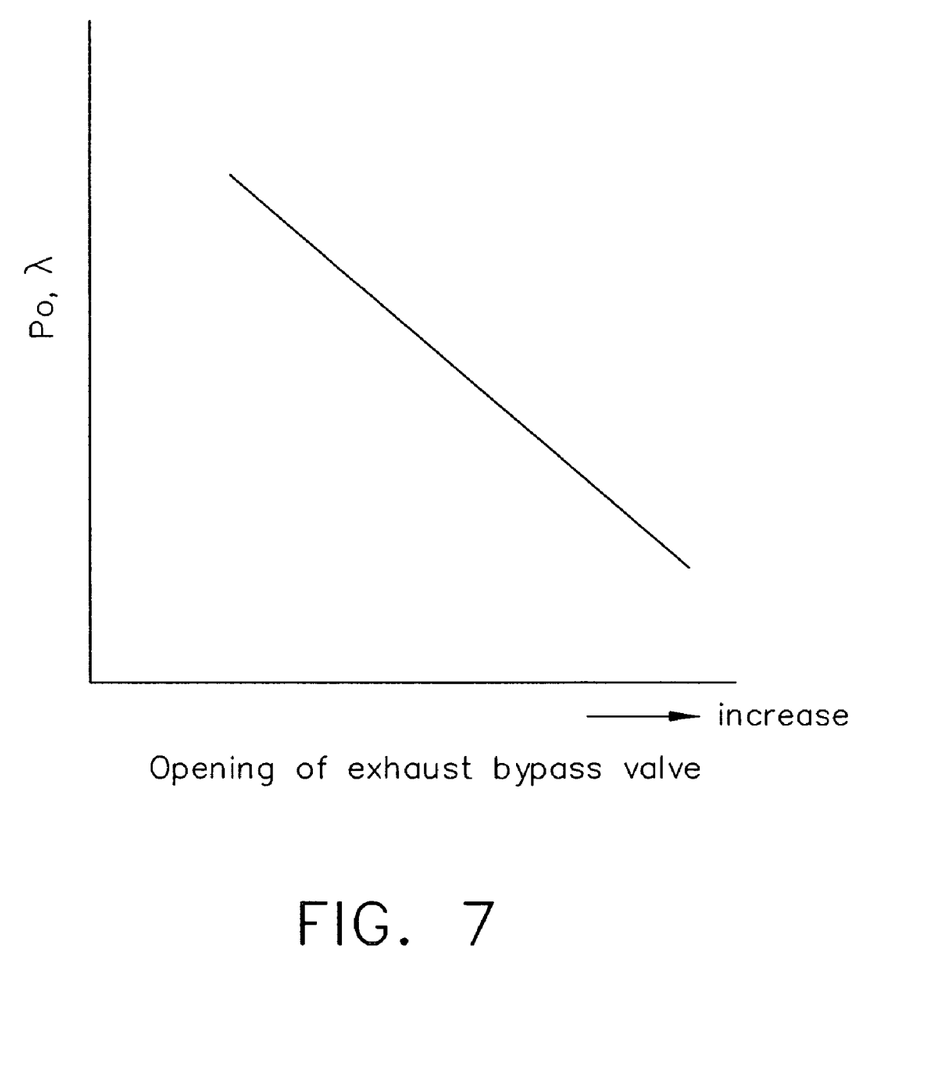
FIG. 7 is a graph showing an opening of the exhaust bypass valve.

For example, as shown in FIG. 6, when it is required to shift excess air ratio $\lambda 1$ at point X to ratio $\lambda \geq 2$ at point Y in a lean burn zone, charging pressure is increased to increase charged air amount introduced into the cylinder room.

By increasing charging pressure, it may be feared that knocking occurs. However, as increased charged air amount causes lower combustion temperature, lean burning atmosphere of excess air ratio λ of 2 or larger can be produced in the combustion chamber without fear of the occurrence of knocking.

As has been described in the foregoing, by controlling output torque of the gas engine so that the relation |ΔTd|−|ΔTs|>0 is maintained at the intersection point of the Ts curve with the Td curve, and further controlling charging pressure by controlling the super charger so that excess air ratio λ becomes 2 or larger without occurrence of misfiring and knocking in combustion in the combustion chamber of the gas engine, stable lean mixture burning of methane gas can be achieved.

In the apparatus of the invention, it is preferable that a common inlet passage for supplying ventilation air methane to cylinders of the engine, a supercharger having a compressor connecting to the common inlet passage, and a supercharger control means to control excess air ratio of the charged air-methane gas mixture to be 2 or larger by controlling charging pressure produced by the supercharger provided upstream of the common inlet passage, are provided.

Further, it is preferable that a mixer for mixing a part of the recovered methane gas with the ventilation air methane gas before the ventilation air methane gas is introduced to the compressor of the supercharger is provided.

BRIEF DESCRIPTION OF THE DRAWINGS

FIGS. 8(a) and 8(b) show the example of when the operation of the engine is stable, and FIGS. 8(c) and 8(d) show when the operation of the engine is unstable.

DETAILED DESCRIPTION OF THE INVENTION

Preferred embodiments of the present invention will now be detailed with reference to the accompanying drawings. It is intended, however, that unless particularly specified, dimensions, materials, relative positions and so forth of the constituent parts in the embodiments shall be interpreted as illustrative only and not as limitative of the scope of the present invention.

Figure 2:
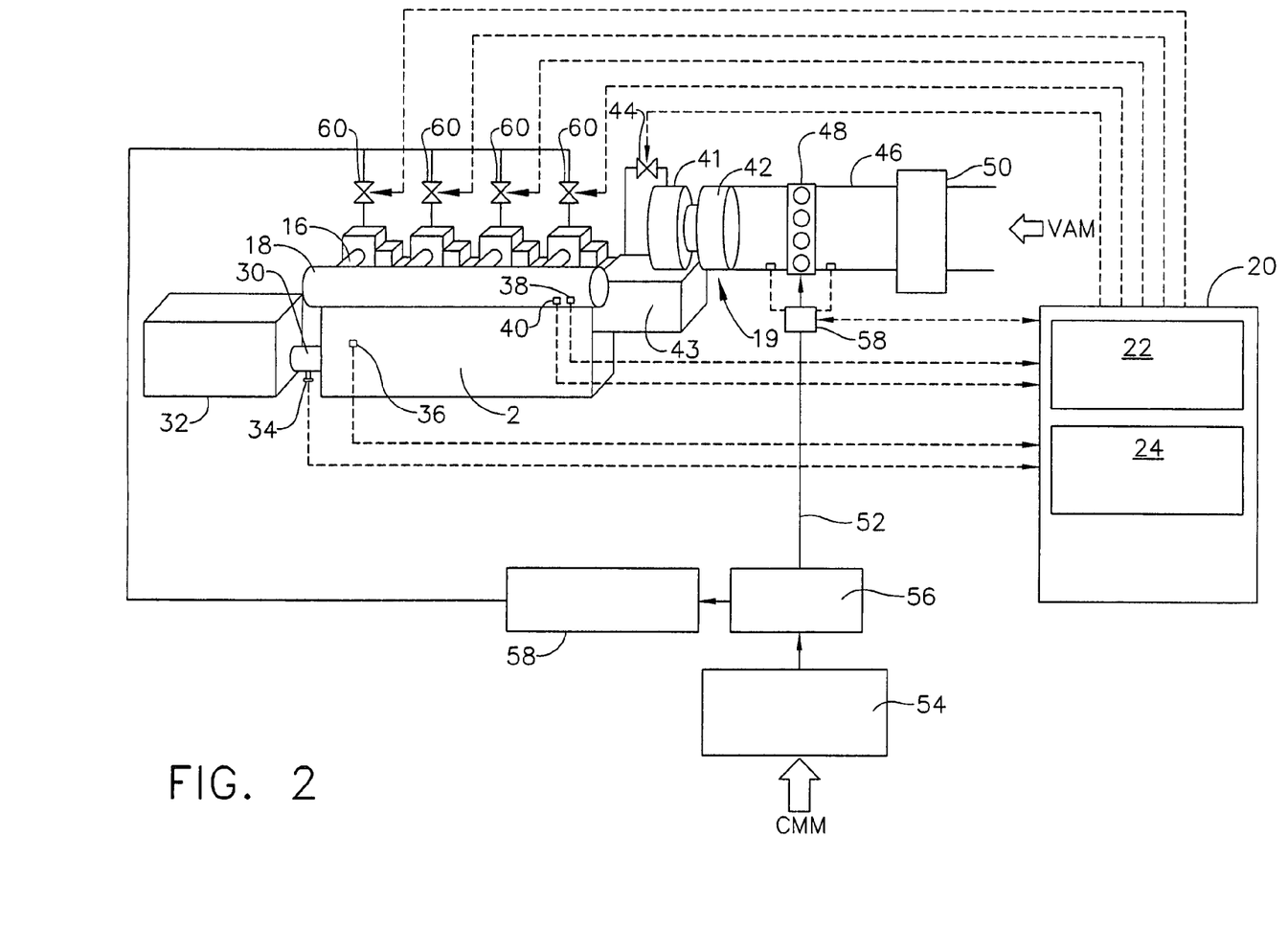
FIG. 2 is a schematic representation of the total construction of the gas engine of FIG. 1.

Referring to FIGS. 1 and 2, reference numeral 2 shows a main part 2 around the combustion chamber of the gas engine. A combustion chamber 10 is formed above a piston 4 in a cylinder room 8 of a cylinder 6. A pilot fuel ignition device 12 having an injection nozzle 12b is mounted above the combustion chamber 10 so that the injection nozzle 12b faces the combustion chamber. Fuel for ignition, such as light fuel oil, is injected into the subsidiary chamber 12c through a supply pipe 12a, and combustion gas of the pilot fuel produced in the subsidiary chamber 12c is injected into the combustion chamber 10 as flame jets 7 through injection holes of the injection nozzle. A lean mixture of methane gas in the main combustion chamber 10 is ignited by the flame jets 7. Mixture of recovered methane gas and ventilated methane gas mixed beforehand is introduced into a common inlet pipe 18 and recovered methane gas is further introduced into an inlet passage 16 which is opened and closed by an inlet valve 14. Thus, inlet air added with those methane gases is introduced into the cylinder room 8. Inlet air added with the mixture of recovered methane gas and ventilated methane gas is compressed by a supercharger 19 and supplied to the common inlet pipe 18, as already explained referring to FIG. 1.

As shown in FIG. 2 showing an overall construction of the gas engine, an electric generator 32 is connected to a crankshaft 30, a rotation speed sensor 34 for detecting engine rotation speed is attached to the crankshaft 30, a cylinder pressure sensor 36 for detecting pressure of the combustion chamber is provided, and a manifold pressure sensor 38 and temperature sensor 40 are attached to the common inlet pipe 18. Detected speed, pressure, and temperature are inputted as detected signals to an engine controller 20.

A supercharger 19 having a gas turbine 41 driven by exhaust gas of the engine and a compressor 42 is connected to the common inlet pipe 18. An exhaust bypass valve 44 for allowing bypass of a part of the exhaust gas entering the turbine is provided at the exhaust gas entrance of the turbine. The exhaust bypass valve 44 is driven by a high speed electric actuator, and opening of the exhaust bypass valve is controlled by a signal from the engine controller 20.

An inlet air pipe 46 is connected to the compressor 42 of the supercharger 19, and ventilated methane gas (ventilation air methane (VAM)) added with recovered methane gas through a mixer 48 compressed by the compressor 42 is introduced to the common inlet pipe 18 via an air cleaner 43. The inlet air pipe 46 is provided with the mixer 48 and a filter 50. Ventilated methane gas (VAM) is introduced from the upstream side of the filter 58. Methane concentration of the ventilation air methane is very low, usually 0.3~0.7%.

The mixer 48 is provided to add recovered methane gas (CMM, coal mine methane) to the ventilation air methane (VAM) flowing in the inlet air pipe 46 to be mixed with the VAM.

The coal mine gas (CMM) is methane gas having methane concentration of 30~50% recovered from a bore for degassing by a vacuum pump.

The recovered methane gas reserved in a buffer tank 54 is introduced to a filter 56, from where a part thereof is introduced to the mixer 48 through a recovered methane gas passage 52 via a first electromagnetic valve 58 and the remnant is introduced into a compressor 58 where it is compressed. The compressed gas is introduced into each of the inlet passages 16 via each of second electromagnetic valves 60. Thus, recovered methane gas (CMM) is further added to the mixture of VAM and CMM flowing in the inlet passages 16 of each cylinder through each of the second electromagnetic valves 60.

Opening periods of the first electromagnetic valve 58 and second electromagnetic valves 60 are controlled by the engine controller 20.

In the gas engine composed as mentioned above, pressure of the recovered methane gas in the buffer tank 54 is adjusted by a pressure adjusting means (not shown) and recovered methane gas is added to the mixture of VAM and CMM flowing in the inlet air pipe 46 through the first electromagnetic valve 58, and further recovered methane gas is added to the mixture of VAM and CMM flowing in the inlet passages 16 through the second electromagnetic valves 60.

The recovered methane gas introduced through the first electromagnetic valve 58 is mixed with the ventilation air methane (VAM) flowing in the inlet air pipe 46. This mixture of VAM and CMM is compressed by the compressor 42 of the super charger 19 and flows into the common inlet pipe 18, from where it flows into the cylinder room 8 of each cylinder passing through the inlet passage 16 with recovered methane gas further added in the inlet passage 16. This air-fuel mixture is introduced into the cylinder room in the suction stroke and compressed in the compression stroke, and then the flame jets 7 are injected from the injection nozzle of the pilot fuel ignition device 12, and the air-fuel mixture is burned in the combustion chamber 10.

Next, combustion control of the gas engine will be explained.

Combustion control is performed by the engine controller 20 provided with a control means 24 for controlling engine output and a control means for controlling excess air ratio $\lambda$.

Figure 3:
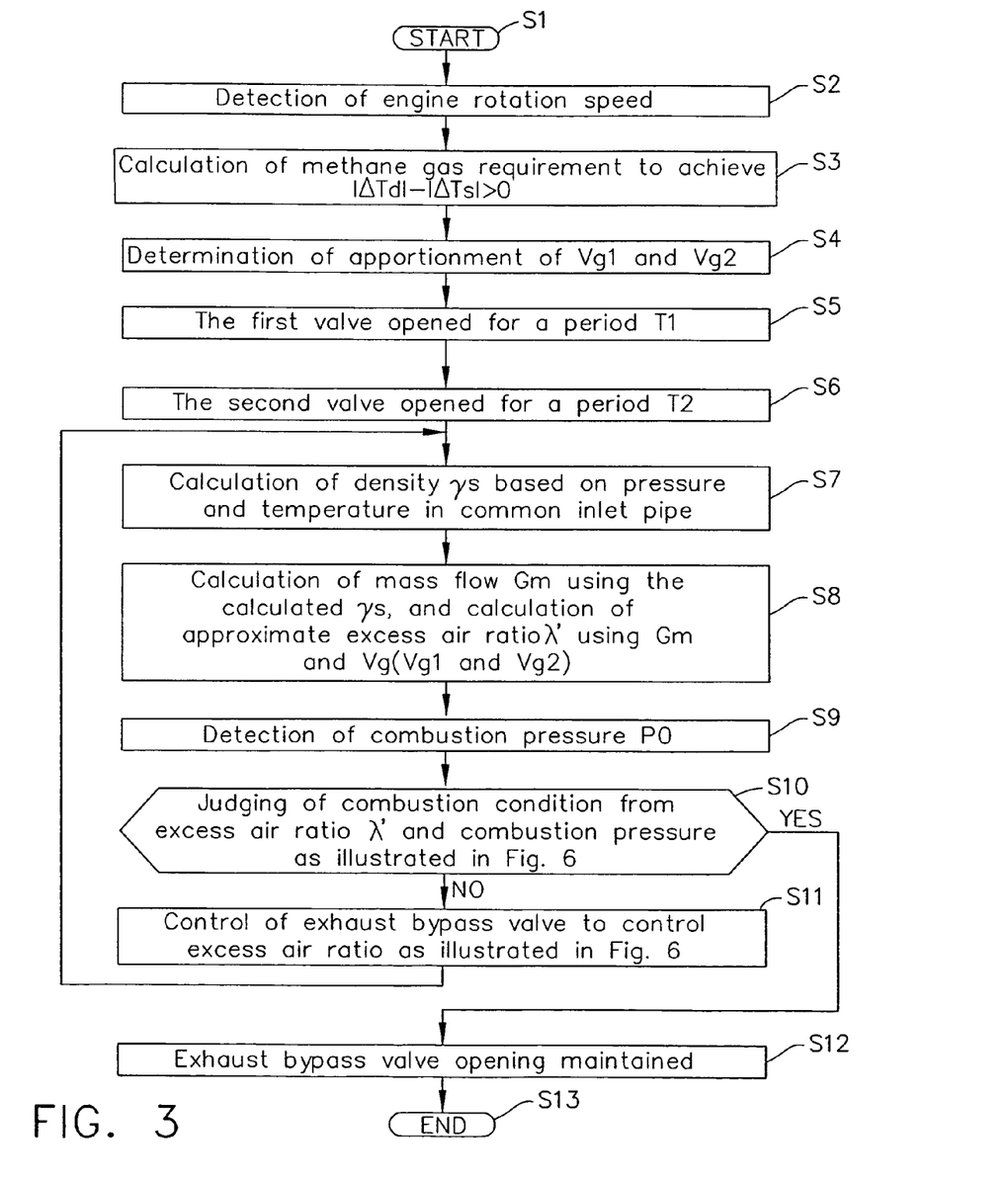
FIG. 3 is a flowchart of combustion control of the gas engine.

The engine output control means 24 will be explained referring to FIG. 3 showing a control flowchart.

Control is started at step S1. At step S2, engine rotation speed is detected by the signal from the rotation speed sensor 34. Then at step S3, methane gas requirement Vg to maintain a relation $|\Delta Td|-|\Delta Ts|>0$ for the detected rotation speed is calculated from a prescribed map MI. In the map M1 is determined a methane gas requirement versus engine rotation speed obtained by an experiment for a combination of gas engine and generator to be driven by the engine.

$|\Delta Ts|$ is the absolute value of the change rate of output torque Ts in relation to rotation speed n, i.e. $|\Delta Ts/\Delta N|$ in the output torque characteristic curve of the engine at the intersection point of the Ts curve with the Td curve, and $|\Delta Td|$ is the absolute value of the change rate of torque Td required to drive the generator 32 in relation to rotation speed n, i.e. $|\Delta Td/\Delta N|$ in the characteristic curve of torque required to drive the generator at the intersection point of the Ts curve with the Td curve.

Figure 4:
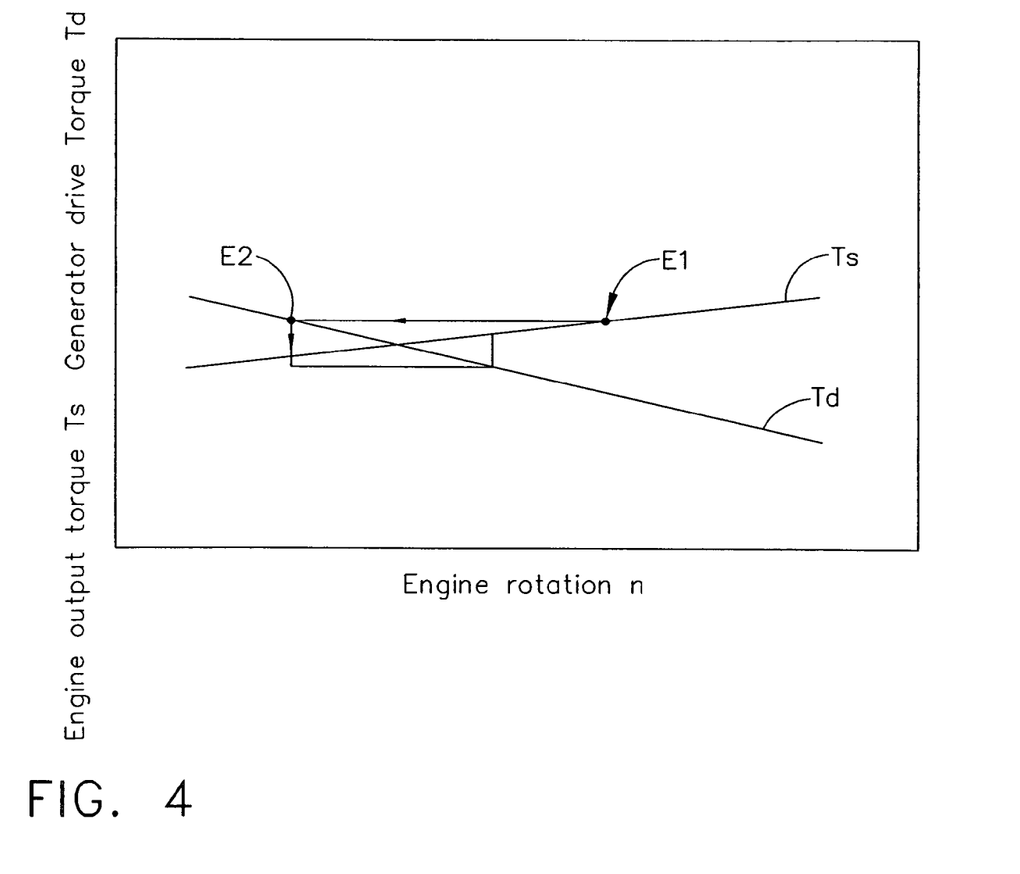
FIG. 4 is a graph showing a relation between torque requirement Td of the generator and output torque Ts of the gas engine versus engine rotation speed n.

In FIG. 4, load torque Td required to drive the generator decreases as rotation speed n increases, whereas output torque Ts of the engine increases as rotation speed increases, and the absolute value of inclination of engine output torque Ts is gentler than that of generator drive torque Td.

By controlling engine output torque as shown in FIG. 4, if rotation speed increases for any reason from that at the intersection point of the Ts curve with the Td curve, at which point the engine operates stably, to a rotation speed at a point E1, the rotation speed tends to decrease to that at a point E2, and ultimately the rotation speed converges to that at the intersection point of both curves Ts and Td, as explained referring to FIG. 8(*a*), and the engine operates stably at the rotation speed at the intersection point.

Figure 5:
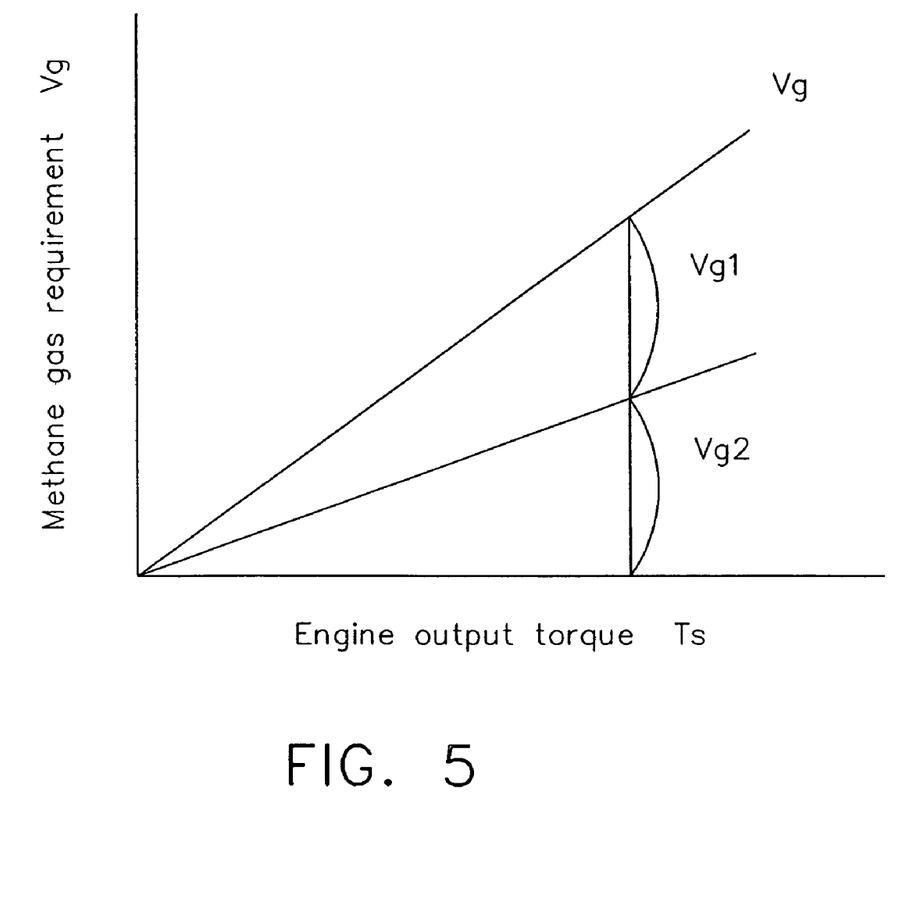
FIG. 5 is a graph showing apportionment proportion of gas flow Vg1 via the first electromagnetic valve and gas flow Vg2 via the second electromagnetic valve versus output torque Ts of the gas engine.

At step S4, the methane gas requirement Vg obtained from the map M1 is apportioned between the first electromagnetic valve 58 and each of the second electromagnetic valves 60 so that gas flow of Vg1 is introduced through the first electromagnetic valve 58 and gas flow of Vg2 is introduced through each of the second electromagnetic valves 60. The apportionment is done based on apportionment proportion characteristics shown in FIG. 5.

At step S5, the opening period T1 of the first electromagnetic valves 58 is controlled to allow gas flow of Vg1. At step S6, the opening period T2 of the second electromagnetic valves 58 is controlled to allow gas flow of Vg1. Thus, the methane gas requirement Vg is introduced into the cylinder room via the first and second electromagnetic valves.

The engine output control means 24 consists of the steps S2 to S6.

Next, the excess air ratio control means 22 will be explained.

At step S7, density $\gamma s$ of the air-methane gas mixture flowing in the common inlet pipe 18 is calculated based on pressure and the temperature detected by the pressure sensor 38 and temperature sensor 40.

At step S8, mass flow Gm of the mixture gas flowing in the common inlet pipe 18 is calculated using the calculated density $\gamma s$, and approximate excess air ratio $\lambda'$ is calculated using the mixture flow Gm and the methane gas requirement Vg calculated at the step S3. As the mixture gas flowing in the common inlet pipe 18 consists of ventilation air methane and a part of recovered methane gas introduced through the first electromagnetic valve 58, said $\lambda'$ is not an accurate calculation value but an approximate value calculated by assuming the mixture in the common inlet pipe 18 consists of only air, for methane concentration of ventilation air methane is usually very small as 0.3~0.7% and methane concentration in the common inlet pipe 18 is very small.

Next, at step S9, cylinder pressure, i.e. combustion pressure P0 is detected. At step S10, mean effective pressure Pm is calculated by using the detected combustion pressure P0 and the calculated excess air ratio $\lambda'$ (or excess air ratio $\lambda$ obtained by correcting the value of $\lambda'$), and whether the combustion has occurred in a zone between a misfire zone C and a knock zone E and further whether such occurred in a zone of excess air ratio $\lambda$ of 2 or larger based on the map as shown in FIG. 6 is judged.

In FIG. 6, the abscissa represents effective mean pressure Pm and ordinate excess air ratio $\lambda$. In this graph, A, B, and C represent a misfire zone respectively, and E represents a knock zone. D represents an excessively rich mixture zone. The zones A, B, and C represent misfire zones of gas engines different in combustion type respectively. The zone A is a misfire zone of a stoichiometrical combustion gas engine, zone B is a misfire zone of spark ignition with a subsidiary chamber type gas engine, and zone C is a misfire zone of light oil injection with a subsidiary chamber type gas engine.

To achieve stable combustion in lean mixture burning of methane fuel, it is necessary to control the combustion so that combustion occurs in a zone not belonging to any of the zones A, B, C, D, and E in FIG. 6.

When it is judged at the step S10 that combustion is occurring in a zone not belonging to any of the zones A~E, for example, it is judged that combustion is occurring at the point X, the excess air ratio control means 22 controls the combustion so that the point X is shifted to the point Y to increase excess air ratio by controlling opening of the exhaust bypass valve 44 for causing bypass of a part of the exhaust gas entering into the turbine 41 of the supercharger 19 via the actuator. The actuator comprises an electric actuator of high speed response and driven by a signal from the engine controller 20. The actuator actuates to decrease opening of the exhaust bypass valve 44 when increasing combustion pressure P0 and excess air ratio $\lambda$, and to increase opening of the exhaust bypass valve 44 when decreasing combustion pressure P0 and excess air ratio $\lambda$.

A conventional mechanical valve drive device of a diaphragm type is slow in response, and boost pressure can not be increased rapidly when the actuator receives a signal to increase opening of the exhaust bypass valve 44. Therefore, there was a tendency that, when intending to shift from the point X to the point Y, the point X would shift toward a point Z in the knock zone E because of retarded boost pressure rise. By adopting the high speed electric actuator, control response of the exhaust bypass valve 44 is increased and shifting from the point X to the point Y in FIG. 6 is performed with certainty.

In this way, excess air ratio $\lambda$ can be controlled by controlling charging pressure of the supercharger. By increasing charging pressure, there may be a fear that knocking will occur. However, as increased charged air amount causes lowering of combustion temperature, a lean burning atmosphere of excess air ratio $\lambda$ of 2 or larger can be produced in the combustion chamber without the fear of knocking.

Although the exhaust bypass valve 44 has been explained, it is also suitable to control charging pressure providing an inlet air bypass valve to the compressor 42. By controlling the inlet bypass valve, the same effect can be achieved.

When it is judged that combustion is occurring in zones other than zones A~E, operation is continued with the opening of the exhaust bypass valve 44 maintained at step S12, and the process ends at step S13.

By controlling combustion of the gas engine as mentioned above, stable lean mixture burning with excess air ratio $\lambda$ of 2 or larger is made possible without occurrence of knocking and misfire, and a gas engine can be obtained which can effectively utilize coal mine methane gas which varies considerably in methane concentration including ventilation air methane which is very low in methane concentration as fuel can be obtained.

Figure 9:
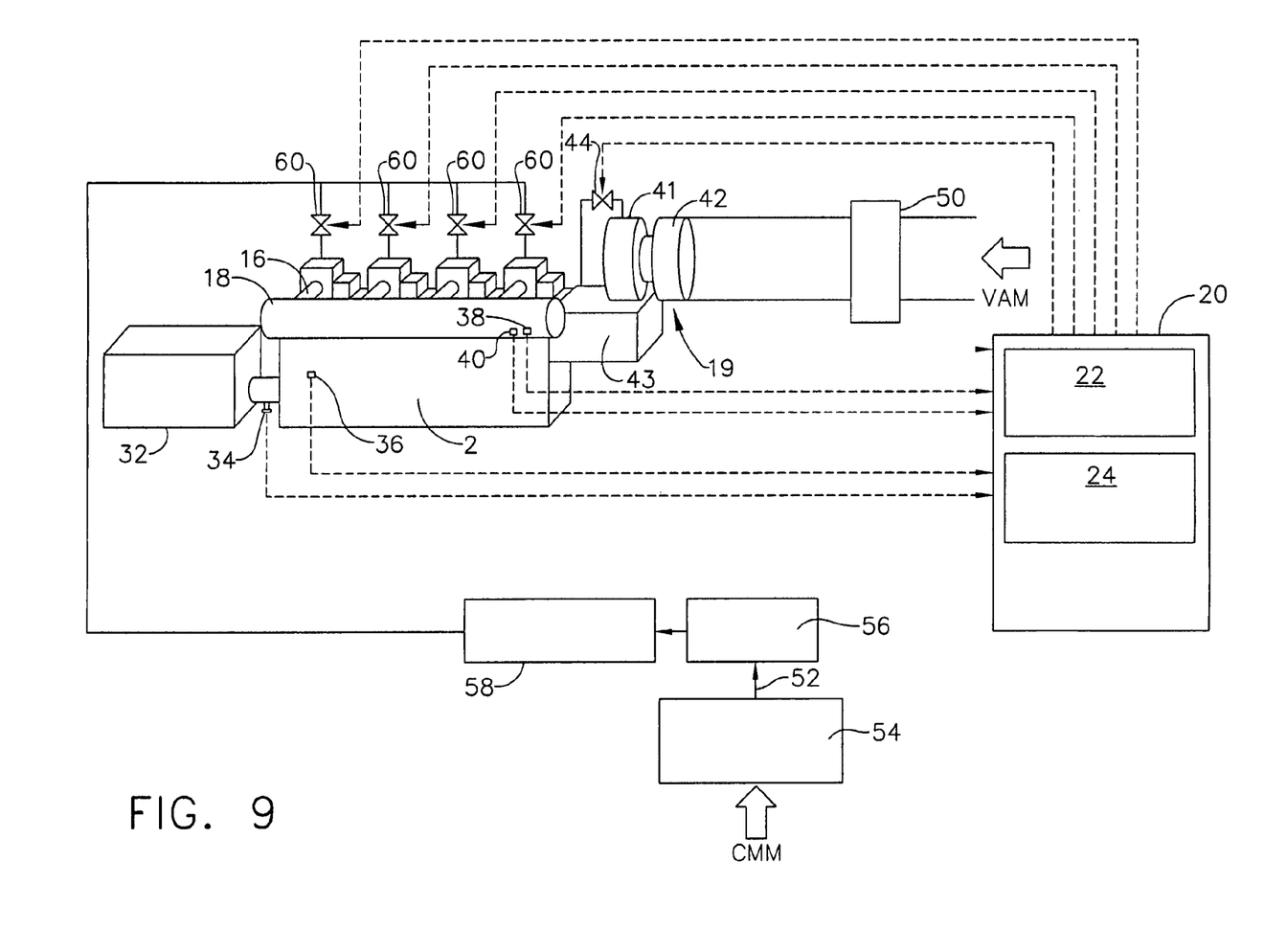
FIG. 9 is a schematic representation of total construction of the gas engine of another embodiment.

Another embodiment of the gas engine is shown in FIG. 9. The gas engine of this embodiment is not provided with the electromagnetic valve 58 and mixer 48 of the first embodiment, and other than that is the same as the first embodiment shown in FIG. 2.

According to the embodiment, recovered methane gas is not introduced to the air inlet pipe 46 through the mixer 48 as is in the first embodiment, and recovered methane gas is introduced into each of the inlet passages 16 only through each of the second electromagnetic valves 60.

Therefore, only ventilation air methane which is very low in methane concentration is contained in the charging air-methane mixture in the common inlet pipe 18. As approximate excess air ratio $\lambda'$ is calculated by using the density $\gamma s$ calculated based on the pressure P1 and temperature T1 of the air-methane mixture in the common inlet pipe 18, the calculated value of excess air ratio $\lambda'$ is nearer to actual excess air ratio $\lambda$ as compared with the case in which recovered methane gas is introduced through the mixer 48 via the first electromagnetic valve 58 before the mixture enters the common inlet pipe 18 as in the first embodiment.

Accordingly, combustion control is performed based on more accurate excess air ratio $\lambda$, and construction of the control apparatus is simplified as compared with the first embodiment.

The invention claimed is:

1. A method of controlling combustion in a gas engine connected to an electric generator to compose a power generator unit, the unit being installed near a coal mine site, the gas engine being of a pilot ignition type gas engine which can utilize recovered methane gas and ventilation air methane gas taken out from the coal mine as its fuel by adjusting methane concentration to produce lean air-methane gas mixture, wherein output torque of the gas engine is controlled so that a relation $|\Delta Td|-|\Delta Ts|>0$ is maintained between $|\Delta Td|$ which is absolute value of change rate of load torque Td required to drive the generator in relation to engine rotation speed n and $|\Delta Ts|$ which is absolute value of change rate of output torque Ts in relation to engine rotation speed n at an intersection point of a Ts-n curve and a Td-n curve, and excess air ratio is controlled to be 2 or larger so that lean mixture burning is performed while avoiding misfiring and knocking by controlling mixing ratio of recovered methane gas with ventilation air methane.

2. A method of controlling combustion in the gas engine according to claim 1, wherein methane gas flow required to maintain the relation $|\Delta Td|-|\Delta Ts|>0$ is determined in a map beforehand based on an experiment on the power unit.

3. A method of controlling combustion in the gas engine according to claim 1, wherein ventilation air methane is introduced into a common inlet passage, recovered methane gas is introduced individually into each cylinder room, and excess air ratio of charged air-methane gas mixture is controlled by controlling charging pressure produced by a supercharger provided upstream of the common inlet passage.

4. A method of controlling combustion in the gas engine according to claim 3, wherein a part of the recovered methane gas is introduced into a supply passage of the ventilation air methane to the supercharger to be mixed with the ventilation air methane.

5. An apparatus for controlling combustion in a gas engine connected to an electric generator to compose a power generator unit, the unit being installed near a coal mine site, the gas engine being of a pilot ignition type gas engine which can utilize recovered methane gas and ventilation air methane gas taken out from the coal mine as its fuel by adjusting methane concentration to produce lean air-methane gas mixture, the apparatus comprising an engine output control means for controlling output torque of the gas engine so that a relation $|\Delta Td|-|\Delta Ts|>0$ is maintained between $|\Delta Td|$ which is absolute value of change rate of load torque Td required to drive the generator in relation to engine rotation speed n and $|\Delta Ts|$ which is absolute value of change rate of output torque Ts in relation to engine rotation speed n at an intersection point of a Ts-n curve and a Td-n curve, and an excess air control means for controlling excess air ratio to be 2 or larger so that lean mixture burning is performed while avoiding misfiring and knocking by controlling mixing ratio of recovered methane gas with ventilation air methane.

6. An apparatus for controlling combustion in the gas engine according to claim 5, wherein a map is provided in which methane gas flow required to maintain the relation $|\Delta Td|-|\Delta Ts|>0$ is determined beforehand based on an experiment on the power unit.

7. An apparatus for controlling combustion in the gas engine according to claim 5, wherein are provided a common inlet passage for supplying ventilation air methane to into cylinders of the engine, a supercharger having a compressor connected to the common inlet passage, and a supercharger control means to control excess air ratio of charged air-methane gas mixture to be 2 or larger by controlling charging pressure produced by the supercharger provided upstream of the common inlet passage.

8. An apparatus for controlling combustion in the gas engine according to claim 7, wherein a mixer for mixing a part of the recovered methane gas with the ventilation air methane gas before the ventilation air methane gas is introduced into the compressor of the supercharger is provided.

* * * * *